US006855906B2

(12) United States Patent
Brailove

(10) Patent No.: US 6,855,906 B2
(45) Date of Patent: Feb. 15, 2005

(54) INDUCTION PLASMA REACTOR

(76) Inventor: Adam Alexander Brailove, 311 The Heights, Gloucester, MA (US) 01930

( * ) Notice: Subject to any disclaimer, the term of this patent is extended or adjusted under 35 U.S.C. 154(b) by 139 days.

(21) Appl. No.: 10/269,778

(22) Filed: Oct. 11, 2002

(65) Prior Publication Data

US 2003/0071035 A1 Apr. 17, 2003

Related U.S. Application Data

(60) Provisional application No. 60/329,850, filed on Oct. 16, 2001.

(51) Int. Cl.[7] ................................................ B23K 10/00

(52) U.S. Cl. ............................ 219/121.36; 219/121.54; 219/121.43; 219/121.48; 156/345.48; 376/133

(58) Field of Search ......................... 219/121.4, 121.41, 219/121.43, 121.48, 123, 121.54; 118/723 MA, 723 I; 156/345.48, 345.44; 376/121, 133

(56) References Cited

U.S. PATENT DOCUMENTS

| | | | | |
|---|---|---|---|---|
| 4,235,668 A | * | 11/1980 | Bass et al. | 173/3 |
| 4,392,918 A | * | 7/1983 | Gaines | 376/133 |
| 4,431,898 A | | 2/1984 | Reinberg et al. | |
| 5,290,382 A | | 3/1994 | Zarowin et al. | |
| 5,505,780 A | * | 4/1996 | Dalvie et al. | 118/723 I |
| 6,150,628 A | | 11/2000 | Smith et al. | |
| 6,552,296 B2 | * | 4/2003 | Smith et al. | 219/121.43 |

FOREIGN PATENT DOCUMENTS

JP 02-260399 10/1990

OTHER PUBLICATIONS

IEEE Transactions on Plasma Science, vol. PS–2 1974 by H.U. Eckert.

* cited by examiner

*Primary Examiner*—Mark Paschall

(57) ABSTRACT

The invention is a plasma-generating device useful in a wide variety of industrial processes. The plasma is formed in a chamber having a toroidal topology, and is heated inductively. As with all inductive plasmas, a primary coil carries an applied AC current, which, in turn, generates a corresponding applied AC magnetic flux inside the plasma. This flux induces current to flow through the plasma in closed paths that encircle the flux, thereby heating and maintaining the plasma. In this invention, the applied AC current flows through the primary coil around substantially the short poloidal direction on the torus. Accordingly, the applied magnetic flux is caused to circulate through the plasma along the larger toroidal direction. Finally, the current induced within the plasma will flow in the poloidal direction, anti-parallel to the applied primary current. The plasma chamber wall is preferably made of metal such as aluminum and includes one or more electrical breaks that extend fully around the chamber wall in the toroidal direction. This prevents poloidal currents from being induced in the chamber wall, ensuring effective power transfer to the plasma. Elastomeric seals made from electrically insulating material seal the breaks.

26 Claims, 8 Drawing Sheets

INDUCTION PLASMA REACTOR

CROSS-REFERENCE TO RELATED APPLICATIONS

This application claims the benefit of Provisional Patent Application Ser. No. 60/329850 filed Oct. 16, 2001.

FEDERALLY SPONSORED RESEARCH

Not applicable

SEQUENCE LISTING OR PROGRAM

Not applicable

BACKGROUND OF THE INVENTION

This invention relates to an apparatus for inductively generating plasma. It relates specifically to a robust and low-cost apparatus for producing a compact volume of high-density plasma. More broadly, this invention relates to methods for performing a variety of useful industrial process such as generating reactive gasses, processing semiconductors, destroying gaseous toxic waste, forming nano-particles, and enhancing gaseous chemical processes using the novel apparatus described herein.

Gaseous plasma discharges are widely applied in numerous industrial and technological processes. In particular, plasmas are used in many semiconductor manufacturing processes, as well as welding, plasma spraying of materials, nano-particle generation and ion sources. In addition to thermal processes like plasma-spraying and welding, a plasma is an efficient means of enhancing chemical reactions. A plasma will break apart the molecules of a feed gas, producing a highly reactive mixture consisting of the incoming feed gas plus neutral radicals, ions, atoms, electrons, and excited molecules. The plasma is therefore widely useful as a 'chemical factory' capable of cracking molecules into lower order forms, breaking down molecules into their atomic constituents, and promoting volume- and surface-based chemical reactions with other molecules that would not otherwise occur.

The many different means of plasma generation known in the art fall into four broad categories depending on how energy is coupled into the plasma. These consist of:

a) DC excitation, in which at least two electrodes are in direct contact with the plasma. Electrical current is made to flow from one electrode to another, through the plasma, thereby transferring energy to the plasma.

b) Capacitive excitation, in which an alternating voltage across two separate electrodes produces an alternating electric field between the electrodes that causes AC current to flow through the plasma. This method is similar to DC excitation, except that the electrodes need not be in direct contact with the plasma, since power is coupled into the plasma capacitively across the plasma sheath.

c) Inductive excitation, in which alternating current is passed through coil located near the plasma. The coil produces an alternating magnetic flux in the plasma. This alternating magnetic flux induces current to flow inside the plasma, according to Faraday's law of electromagnetic induction, thereby heating the plasma. Inductively excited plasmas are often referred to as "inductively-coupled" or equivalently "transformer-coupled" plasmas, since the coil functions electrically as the primary winding of a transformer and the plasma itself plays the role of the secondary winding of the transformer; the two windings being electrically coupled together by AC magnetic flux.

d) Resonant excitation. This category includes a wide variety of excitation methods that transfer energy into the plasma by exciting waves or natural resonances of the plasma. These methods include most commonly microwave and helicon excitation.

The method of DC excitation is often employed in high-pressure thermal arc plasmas that are primarily used in the heating of materials; for example welding and plasma spraying. DC glow discharges, which typically operate at lower pressures, are frequently used in cleaning metallic surfaces. In either case, the DC discharge generally is accompanied by the erosion of one of the electrodes due to thermal or sputtering effects. Although erosion is desired for some applications such as welding, in many fine processes, such as semiconductor processing, electrode erosion represents a source of metals contamination and is highly undesirable.

Capacitive plasma excitation has been widely applied in the manufacturing of semiconductor chips. In contrast to the DC discharge, it is possible to protect the electrodes of a capacitively excited plasma with a dielectric covering that reduces metals contamination, yet still permits power to be delivered into the plasma. Nevertheless, to achieve significant capacitive power transfer to the plasma it is necessary to drive the electrodes to relatively high voltages. These voltages are often in the hundreds or even thousands of volts. Thus, the mean plasma potential relative to a grounded chamber will be rather high, as will the instantaneous potential between the plasma and the electrodes. These potentials appear across the plasma sheath. Positive ions that reach the plasma boundary will subsequently be accelerated through the sheath toward the chamber walls and the powered electrodes and will reach energies corresponding to the potential that appears across the sheath. Consequently, these ions can be accelerated to energies that are sufficient to sputter electrode and chamber material into the plasma. Not only can this produce plasma contamination and a gradual erosion of the chamber walls, but it also represents a significant source of power loss for the plasma. High plasma potentials and high sheath voltages are undesirable.

More recently, the trend in semiconductor processing has been toward the use of inductively excited plasma. This is primarily because inductive plasmas have higher densities and lower voltages. It is known among those skilled in the art that inductive excitation is a more efficient means of heating a plasma. Inductive plasmas are characterized by substantially higher plasma densities and therefore result in correspondingly faster, more productive processing methods. Inductive plasmas also tend to have significantly lower plasma potentials and sheath voltages, which significantly reduces the problems associated with capacitive excitation described above.

Hittorf made the first inductively heated plasma in 1884. In the classic configuration, a cylindrical tube made of glass, quartz, ceramic, or other dielectric is wrapped with a coil comprising a number of turns. A working gas at some controlled pressure is sealed inside the tube or caused to flow through it. The ends of the coil are connected to a source of AC power, which drives an alternating current through the coil. This AC coil current in turn establishes an alternating longitudinal magnetic field inside the tube that induces current to circulate through the conductive plasma. The induced plasma current circulates around the axial magnetic flux in a direction opposite the applied coil current, according to Faraday's law.

Even today, this simple design is applied quite widely. At high pressures in the working gas, this configuration is commonly referred to as an inductively-coupled plasma torch. At lower pressures, this cylindrical design is often used in semiconductor processing equipment. Another variation of the inductively-coupled plasma uses a flat, spiral-shaped coil coupled to the plasma through a flat dielectric window. This "electric stovetop" coil design generates a uniform plasma over a large area, and thus has proven to be well suited for processing the large flat substrates such as the silicon wafers used in microchip manufacturing.

Finally, resonant plasma excitation is known to be effective at producing plasmas of very high density and low sheath voltages. Microwave plasmas in particular, are now widely used in semiconductor processing equipment. Generally, a resonantly excited plasma must be immersed in a precisely controlled DC magnetic field. The overall cost, complexity and size of such a system is relatively large compared to an inductive system, due to the microwave power supply, a microwave tuner, DC magnetic field coils and their associated DC power supplies. These drawbacks often preclude the use of resonant excitation in many applications.

The use of inductively heated plasma appears to be generally advantageous for many industrial applications. It is simpler and less costly than resonant excitation, yet it is superior to DC and capacitive excitation because of high plasma density and low sheath voltage. On the other hand, inductive plasmas do have some weaknesses toward which this invention is directed.

First, although the problem of erosion and contamination caused by the high voltage sheath is reduced when compared to a capacitive or DC discharge, it is not completely eliminated. Recall that in an inductive plasma, the coil, of N turns, forms the primary of a transformer and the current loop, inside the plasma itself, forms the one-turn secondary of the transformer. (This transformer will henceforth be referred to as the plasma transformer in order to distinguish it from the matching transformer, to be introduced later). Higher plasma currents result in higher plasma densities, therefore, based on the well known electrical behavior of transformers, it seems advantageous to increase the number of primary turns, N. Unfortunately, this strategy leads to higher voltages across the primary coil of the plasma transformer. These high voltages, especially near the ends of the primary coil, couple capacitively to the plasma and produce high energy ion bombardment of the walls resulting in sputter contamination, wall erosion, and energy loss in these areas.

One well-known means of addressing this problem has been to employ an electrostatic shield between the coil and the plasma. Such shields are designed to be electrically conductive in the direction of the electric field that appears end-to-end across the terminals of the coil, but electrically non-conductive in the direction of current flow. In this way, the coil's electric field is shunted away from the plasma, while the magnetic flux is not. The shields typically comprise a series of metal strips running perpendicular to the direction of current flow. In practice, however, the oscillating magnetic flux induces eddy currents in the shield, thereby absorbing part of the applied power.

Another problem with inductive heating is the need for a tube, chamber wall, or window made of dielectric material. Materials such as ceramic, quartz, or glass are typically used. Since plasma processes are often operated at low pressure, these parts must be strong enough to withstand external atmospheric pressures, often over large areas. They must also be able to efficiently transmit the flux of primary coil into the plasma volume. Finally, they must withstand the temperatures and thermal stresses resulting from heat flowing out of the plasma to the walls of the plasma chamber.

Ceramics and glasses are brittle materials that are sensitive to thermal shock or slight mechanical imperfections. They can shatter explosively under vacuum pressure. Many applications of plasmas also involve the processing of toxic gasses, particularly in semiconductor manufacturing and gaseous waste treatment. The use of these brittle chamber materials with toxic gasses poses a risk of sudden uncontrolled release. Furthermore, heat deposited on the inside surface of the plasma chamber must somehow be removed. Unfortunately, most dielectric materials have poor thermal conductivity. The difficulty of cooling the dielectric portion of the plasma chamber is compounded in large volume applications by the need to make the chamber wall thick enough to withstand vacuum pressure. Finally, these dielectric materials are costly. The cost grows very rapidly as the dimensions of the chamber are increased. For all these reasons it would be advantageous to find an alternative to the large areas of dielectric chamber material.

Another weakness of most inductively coupled plasma reactors of cylindrical or planar coil geometry is related to their topology. Magnetic field lines always form closed curves. For example, in the cylindrical geometry of the inductively-coupled plasma torch, the primary coil produces a dipole magnetic field: the field passes through the center of the coil on the inside of the plasma chamber. At the ends of the coil, however, the field inevitably penetrates through the chamber wall and closes upon itself on the outside of the coil. This external magnetic flux is in a sense 'wasted' since it does not contribute to the heating of the plasma. Furthermore, were the plasma chamber to made of conductive material such as metal, the magnetic flux penetrating through the chamber wall at the coil ends would induce eddy currents in the chamber wall, resulting in significant power loss and inefficient heating of the plasma. Even in a chamber made of dielectric material, the magnetic field extends a significant distance outside the chamber. This stray field can produce severe electromagnetic interference for nearby equipment and, depending on the frequency, can illegally interfere with radio communications. The interference is generally suppressed with a metal enclosure or shielding around the plasma reactor, but the stray field will induce eddy-currents in the shielding, resulting in power loss. In summary, there are undesirable eddy-currents induced in metal surfaces wherever the magnetic field created by the primary coil penetrates a metal surface.

The topology of the torus has long been recognized among designers of nuclear fusion equipment as particularly desirable. The fundamental reason is that a toroidal surface can be described by two cyclic, or closed, dimensions that are orthogonal to each other. Since magnetic fluxes and the associated AC electrical currents always form closed loops, and are orthogonal to each other, the torus lends itself to plasma reactor design.

Excluding nuclear fusion reactors, the toroidal design is not commonly applied in industrial plasma reactors. Nevertheless, an early reference to an inductively-coupled toroidal plasma can be found in IEEE Transactions on Plasma Science, Vol. PS-2, 1974 by H. U. Eckert. U.S. Pat. No. 4,431,898 teaches the use of an inductively coupled toroidal reactor for semiconductor manufacturing. Similar teaching is found in Japan patent 02-260399, and U.S. Pat. No. 5,290,382. Recently, U.S. Pat. No. 6,150,628 described a toroidal reactor having a metal chamber. All of this prior art is fundamentally similar, comprising:

a) a toroidal plasma chamber;

b) a closed magnetic ring of ferrite or laminated iron passing through the center hole of the toroidal plasma chamber and closing around it;

c) a wire, forming the transformer primary winding, wrapped around the magnetic ring such that the turns pass through the center hole of the magnetic ring;

d) an AC power source coupled to the ends of the primary winding.

In this way, the primary winding generates an AC magnetic flux that is confined to the magnetic circuit formed by the ring of magnetic material. The AC magnetic flux, passing through the center of the plasma induces currents in the plasma that circulate around the flux and, therefore, around the center hole in the plasma chamber. The essential feature is that the plasma forms a closed loop surrounding the flux-carrying magnetic core.

This design suffers from the large quantity of magnetic material required. Because the magnetic material must entirely surround the plasma itself, as well as the plasma chamber, a rather large amount is needed. At low frequencies such as 60 Hz, one may use a laminated iron core, which is inexpensive, but heavy and very bulky. At higher frequencies, where it is more desirable to operate most inductive plasmas, expensive ferrite materials are required. The long magnetic circuit also tends to limit the efficiency of power transfer through the transformer. At the frequencies above 10 MHz, where most semiconductor processing plasmas operate, ferrite materials become rapidly more lossy and more expensive.

BRIEF SUMMARY OF THE INVENTION

Accordingly, it is a principle object of this invention to provide a plasma generating apparatus possessing the following features:

a) High plasma density, leading to the efficient breakdown of feed gasses, and therefore high productivity applications.

b) Low plasma potential and low sheath voltages, minimizing contamination of the plasma by chamber wall material and minimizing erosion of the plasma chamber walls.

c) A relatively low cost and compact means of delivering power to the plasma comprising an AC switching power supply, closely coupled to the plasma.

d) A plasma chamber composed substantially of metal thereby leading to safe operation with toxic gasses, efficient cooling of the chamber, and reduced cost through the elimination of large ceramic components.

e) A means of coupling power into the plasma through a transformer using no magnetic material such as ferrite, or alternately, using a small ferrite core transformer, in either case thereby reducing cost and allowing operation at higher frequencies.

It is a further object of this invention to provide a plasma generating apparatus as described above, for etching, cleaning, ashing, film depositing, or otherwise processing semiconductors and the surface of other materials.

It is a further object of this invention to provide a plasma generating apparatus as described above, that can be coupled to an existing semiconductor processing chamber and will dissociate and emit reactive gasses such as chlorine, fluorine, or oxygen into the chamber, thereby cleaning the inner walls of the semiconductor processing chamber.

It is a further object of this invention to provide a plasma generating apparatus as described above, into which gaseous toxic waste materials are flowed and are thereby destroyed, decomposed or reacted to form less hazardous materials.

It is a further object of this invention to provide a plasma generating apparatus as described above, from which ions are electrostatically extracted, thereby providing an ion source.

It is a further object of this invention to provide a plasma generating apparatus as described above, through which a mixture of various gasses can be flowed, thereby promoting desirable chemical reactions among the constituents of the mixture.

The present invention is a plasma-generating device useful in a wide variety of industrial processes. The plasma is formed in a chamber having a toroidal topology, and is heated inductively. As with all inductive plasmas, a primary coil carries an applied AC current, which, in turn, generates a corresponding applied AC magnetic flux inside the plasma. This flux induces current to flow through the plasma in closed paths that encircle the flux, thereby heating and maintaining the plasma.

In this invention, the applied AC current flows through the primary coil around substantially the short poloidal direction on the torus. Accordingly, the applied magnetic flux is caused to circulate through the plasma along the larger toroidal direction. Finally, the current induced within the plasma will flow in the poloidal direction, anti-parallel to the applied primary current.

The plasma chamber wall is preferably made of metal such as aluminum and includes one or more electrical breaks that extend fully around the chamber wall in the toroidal direction. This prevents poloidal currents from being induced in the chamber wall, ensuring effective power transfer to the plasma. Elastomeric seals made from electrically insulating material seal the breaks.

This novel design makes it possible to achieve the objects of the invention discussed above. The ramifications, advantages, and embodiments of the invention will be made fully apparent in the detailed description and figures that follow.

DETAILED DESCRIPTION OF THE INVENTION

Figure 1:
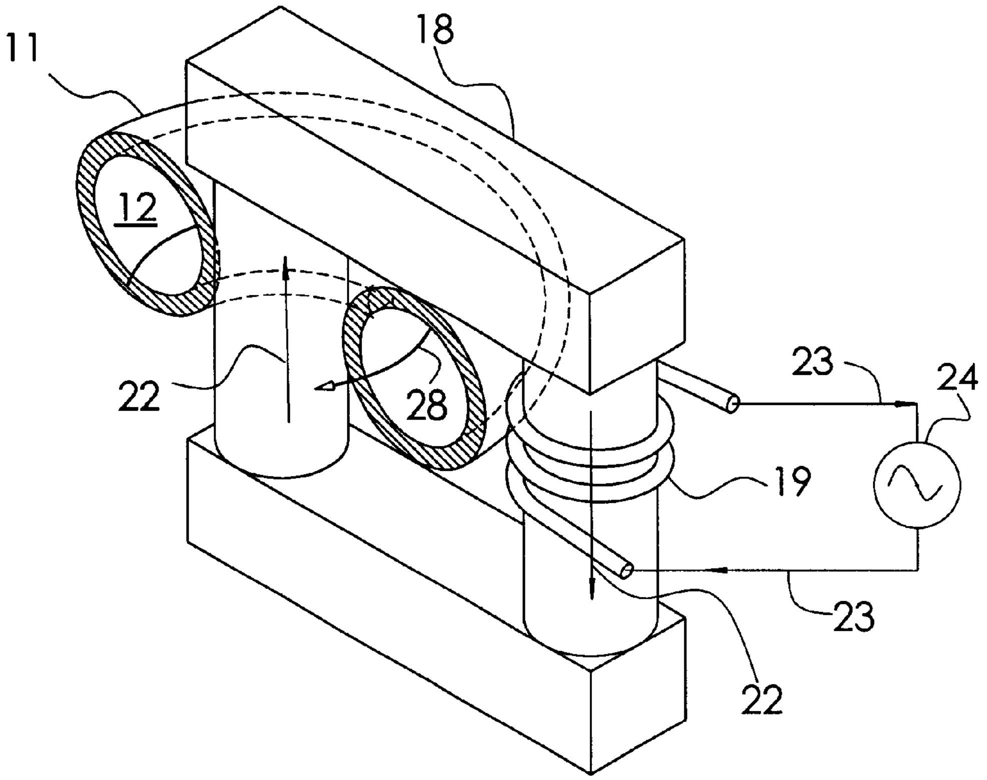
PRIOR ART FIG. 1
FIG. 1 Isometric sectional view of prior art.

FIG. 1 is a partially sectioned isometric view which illustrates conceptually the prior art of H. U. Eckert (IEEE Transactions on Plasma Science, Vol. PS-2, 1974) as well as patents U.S. Pat. No. 4,431,898, Japan 02-260399, U.S. Pat. No. 5,290,382 and U.S. Pat. No. 6,150,628. The toroidal plasma chamber wall 11 is shown sectioned along a center-line to expose the inside. The toroidal plasma chamber 12 refers to the void that is bounded and defined by the chamber wall 11. The plasma chamber 12 is filled with a working gas at some controllable pressure as well as with the plasma itself. The gas and plasma are not separately illustrated or numbered since they coincide with the plasma chamber 12. An optional gas inlet and outlet, which are not shown in this figure, allow the working gas to flow through the chamber.

Plasma transformer magnetic core 18 forms a closed magnetic path that penetrates through the center hole of the toroidal plasma chamber 12 and encircles a portion of the plasma. Plasma transformer primary coil 19 is also wound around the core 18, and is driven by AC power supply 24. The applied AC current 23 flowing in the coil 19 then establishes an AC magnetic flux 22 in the core 18 that penetrates the center hole of the toroidal plasma. Accordingly, the AC magnetic flux 22 induces an AC circulating plasma current 28 to flow through the conductive plasma as required by Faraday's law of induction.

Figure 2:
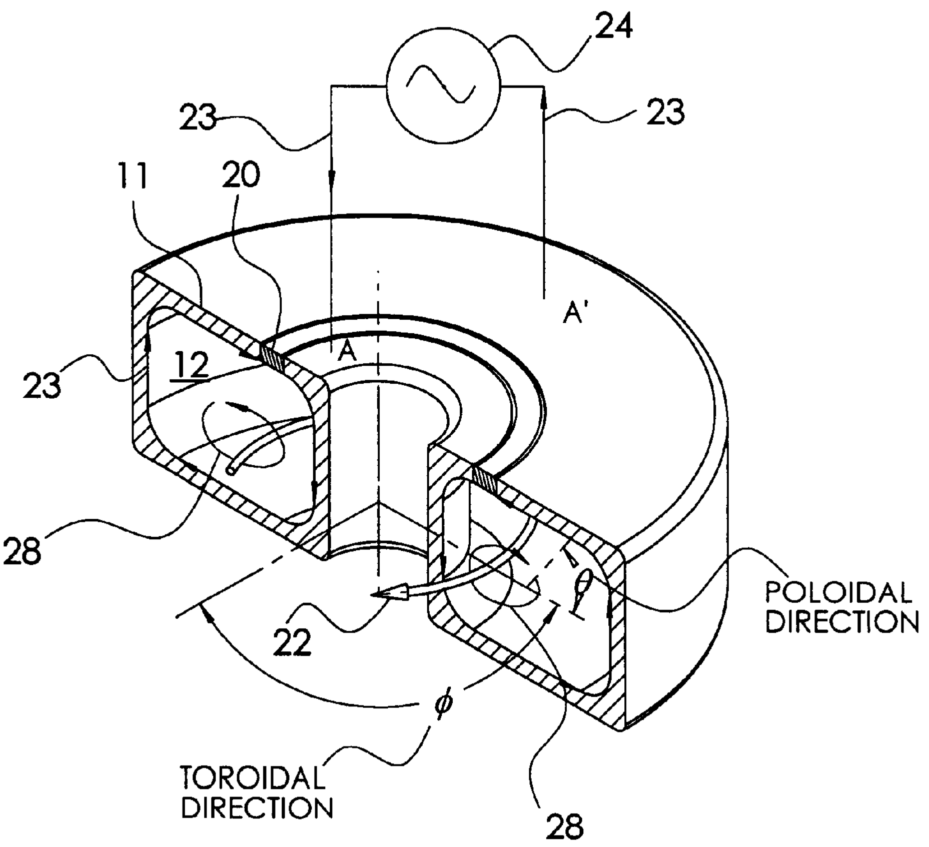
FIG. 2 Isometric sectional view of the present invention, shown conceptually.

FIG. 2 illustrates the present invention conceptually. The figure is an isometric projection a half section of the apparatus. We use this figure primarily for illustrating the fundamental toroidal coordinates and for comparing the flow of current and the direction of magnetic flux with that of the prior art.

Note first, that any point on a toroidal surface can be defined by two angular coordinates, $\phi$ and $\theta$, as illustrated in FIG. 2. The coordinate $\phi$ measures angles along the long or toroidal direction that encircles the center hole. The coordinate $\theta$ measures angles along the short or poloidal direction. The terms poloidal and toroidal are critical terminology that will be used extensively in the remainder of this patent.

Note also that throughout this patent the terms 'torus' and 'toroidal' are used in a topological sense, not a geometric sense. The torus referenced here need not, in general, be a 'regular torus' having circular sections when cut along either a toroidal or poloidal plane.

The plasma chamber wall 11 of FIG. 2 is made from an electrically conductive material. There is an electrical break or gap in the chamber wall that extends completely around the chamber in the toroidal direction. An insulating seal 20 seals this break to maintain the integrity of the chamber 12. Thus no gas or plasma can pass through the break, yet DC electrical currents cannot flow across the break and most importantly, there is no electrical continuity to the chamber wall 11 in the poloidal direction. That is, an AC magnetic flux in the toroidal direction cannot induce current to circulate through the chamber wall 11 in the poloidal direction. AC power source 24 is connected across the break at terminals A and A'. Applied AC current 23 (indicated by arrows) will flow in the poloidal direction through the conductive chamber wall 11 surrounding the plasma contained in the chamber 12. The applied current 23 will establish AC magnetic flux 22 that extends completely around the chamber 12 in the toroidal direction. This AC flux 22 will induce current 28 to circulate inside the conductive plasma, thereby heating it. The induced plasma current 28 will circulate in the poloidal direction, in a sense that is opposite to the applied current 23. Note that the flux 22 advantageously passes only through the plasma and does not extend outside the plasma chamber substantially. The flux 22 is directed essentially parallel to the chamber wall 11 everywhere, therefore it does not penetrate the conductive wall 11 and does not induce wasteful eddy currents. The toroidal design, having no end, does not suffer from the end effects, wasted flux and eddy currents of cylindrical or planar designs. This advantageous topology leads to an efficient use of power and to high plasma densities.

Note also the fundamental topological difference between the prior art of FIG. 1 and this invention in FIG. 2. In the prior art, the magnetic flux 22 encircles the plasma torus in the poloidal direction and the induced current 28 flows in the toroidal direction. In the present invention the magnetic flux 22 encircles the plasma torus in the toroidal direction and the induced current 28 flows in the poloidal direction. Furthermore, the present invention does not require a magnetic core that penetrates through the center hole of the torus, whereas the magnetic core is essential in the prior art.

Figure 3:
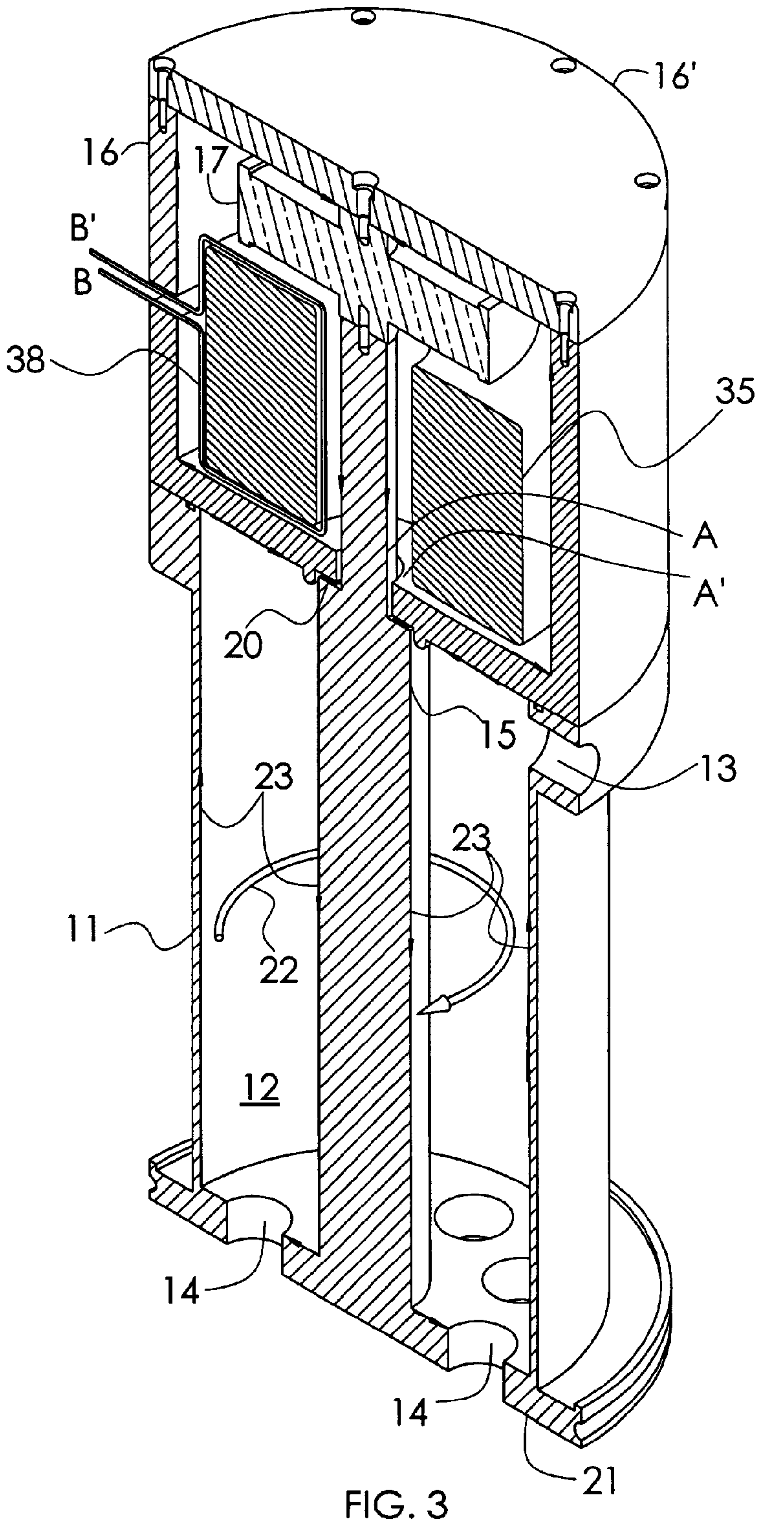
FIG. 3 Isometric sectional view of the preferred embodiment of the present invention.

FIG. 3 shows an isometric section view of the preferred embodiment of this invention. The section is taken along a poloidal plane of the apparatus. The plasma chamber 12 is bounded by a conductive plasma chamber wall 11 that comprises two coaxial cylinders with closed ends. Nevertheless, plasma chamber 12 is still topologically a torus.

Note that chamber wall 11 refers to the entire vessel, which contains and bounds the chamber 12, the plasma, and the gas. In this principal embodiment, and in the first alternate embodiment described below, portions of the separately numbered parts 15 and 16 form portions of chamber wall 11.

The applied current 23 will flow in the poloidal sense through the walls of the chamber. At high frequencies electrical current tends to flow on the surfaces of a conductor as suggested by the arrows in the figure. During one electrical phase, current 23 will flow as shown down the center conductor 15, radially outward at the end of the chamber, up the inside surface of the outer cylindrical wall and radially inward across the bottom surface of transformer housing 16. There is an insulating seal 20 extending fully around the axis of the chamber in the toroidal direction. Insulating seal 20 provides an electrical break in the otherwise closed current path described above. Accordingly, the conductive current path, extending poloidally through the chamber walls, from terminal A to A', constitutes the primary coil of the plasma transformer.

As before, the applied current 23 in this primary coil generates an AC magnetic flux 22 that extends fully around the chamber in the toroidal direction. This flux, penetrating through the plasma, will induce plasma currents to circulate through the plasma around the flux in the poloidal direction. The direction of these induced currents will be substantially opposite to the applied current 23. The induced current is not shown in this figure for clarity.

The plasma chamber wall 11 has openings for admitting gas and exhausting reaction products. A gas inlet 13 for admitting a working gas or mixture of gasses that one desires to be reacted, decomposed and or ionized is provided in this embodiment. The gas will typically be admitted via a pipe or flanged chamber connected to inlet 13. There are also multiple outlets 14 shown in this particular embodiment. The outlets permit the products of the plasma reactions to leave the plasma chamber. These outlets 14 will typically be coupled to a pumping system. This preferred embodiment of FIG. 3 provides a mounting flange 21 of standard design that allows the apparatus to be easily mounted to a vacuum chamber or a vacuum pipe.

When the invention is used for treating gaseous toxic waste, for example, the outlets 14 transmit treated wastes and would be coupled to a pipe to carry the waste stream to subsequent treatment equipment or to a pump for elimination of the treated waste. Alternately, when the invention is used for generating reactive gas for cleaning a semiconductor processing chamber, the outlets transmit reactive gas generated by the plasma to the chamber to be cleaned. When the invention is used as an ion source, the outlet 14 will be coupled to a vacuum system and located near electrically biased electrodes for extracting ions from the plasma.

The gas is typically admitted at a controlled pressure or flow rate by a system of valves, orifices, and or flow controllers upstream of the inlet 13. Alternatively, or in combination, valves and orifices downstream of the outlet 14 may be used to control the pressure and flow. Indeed the inlet 13 and outlet 14 are themselves orifices, the dimensions of which may be used to establish the desired pressure and flow. The required pressure and flow vary greatly depending on the application. Typical pressures range from 0.5 to 50 milliTorr for ion source and chip processing applications, to several Torr for reactive gas generation to near atmospheric pressure (760 Torr) in thermal arc applications. Therefore, the size, shape, number and placement the inlet and outlet openings will depend to a great extent on the application. Nevertheless, the design of a gas flow and pressure control system is straightforward and well understood to to those skilled in the art.

It is desirable, particularly in higher-pressure applications of the plasma reactor, that the in-flowing and or out-flowing gasses be stirred or mixed efficiently. Hot gasses are more buoyant than cooler gasses, which can lead to stagnation, instability, and inefficient flow patterns, depending on the orientation of the plasma chamber. This problem is remedied by tilting the gas inlet 13 at an angle so that gas flows in a spiral path from inlet to outlet, around the center conductor 15.

Similarly, in applications such as chamber cleaning or semiconductor manufacturing, it is desirable that the exhaust gasses be spread more uniformly over their target. It that case, a multiplicity of small outlet apertures 14 can be formed, each at a different angle, so that the exhaust is well dispersed.

In some reactive gas applications it is sometimes undesirable to have charged ions emitted from the reactor along with the desired neutral reactive gas. Ions are efficiently neutralized when they contact a chamber wall. Therefore, it is possible to filter the ions out of the exhaust stream simply by forming exhaust apertures that are small, approximately 3 mm or less, and are at least as long as their diameter. This provides sufficient surface area for ion neutralization as the exhaust gasses pass through.

The electrical impedance of inductive plasmas is often quite low, in the range of a few ohms. The plasma transformer of FIG. 3 comprises a single-turn primary coil (the chamber wall 11) inductively coupled to a single turn secondary coil (the plasma). Since the turns ratio of this plasma transformer is therefore 1:1, the impedance appearing across the terminals A–A' of the primary will also be quite low. This low impedance corresponds to a high current, and a low voltage across the primary terminals A–A'. This, in turn, results in a low voltage across the plasma sheath, which is one of the primary objects of this invention and is advantageous for reasons discussed earlier.

On the other hand, most commercial radio-frequency power supplies are designed to have an output impedance of 50 ohms, since they are designed to be connected to their load through a 50-ohm coaxial cable. In order to avoid reflecting RF power from the load back into the power supply, it is necessary to also match the impedance of the load and the cable with a matching circuit. Even if an AC power supply is coupled directly to the load, without any transmission line between them, it is generally easier to design a power supply that works efficiently at higher load impedances. To improve the match between the load across A–A' and the power supply, an integrated matching circuit is provided in this embodiment.

Following the applied current 23 on the center conductor 15 upward past the insulating seal 20 at terminal A, we see that the current passes through a hole in a matching transformer magnetic core 35 and is connected to one terminal of capacitor 17. Following the current in the opposite direction, the current flows through the primary coil of the plasma transformer from A, past the insulating seal 20, to A'. It then flows across the inner surface of matching transformer housing 16 and across the matching transformer housing cover 16' to the opposite terminal of capacitor 17, closing the circuit. Two or more turns of wire (only one is shown in the figure for clarity) are wrapped around matching transformer magnetic core 35 forming the matching transformer primary winding 38. Note that in contrast to the prior art, the magnetic core of the present invention forms part of the matching transformer, not the plasma transformer, and does not encircle the plasma, allowing the quantity of magnetic material to be substantially less than the prior art.

Figures 8A, 8B, 8C, 8D:
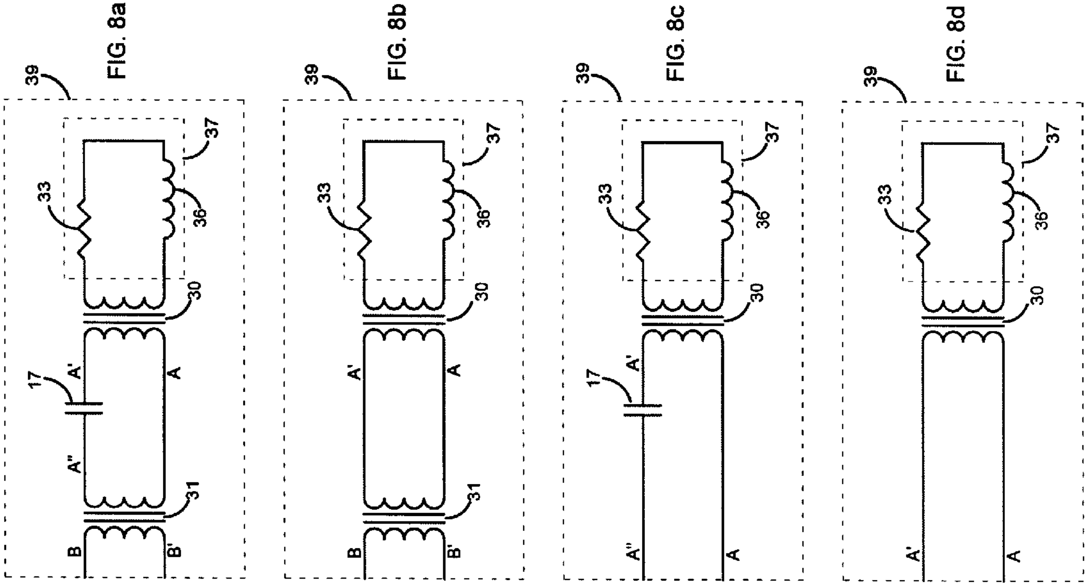
FIG. 8 Schematic of the plasma reactor equivalent circuit (a–d)

Referring simultaneously to the equivalent circuit in FIG. **8*a*, it can be seen that the plasma transformer 30 has a load across its secondary comprising a lumped plasma resistance 33 and lumped plasma inductance 36. Together they approximately model the plasma impedance 37. The primary coil of plasma transformer 30, terminals A–A', is connected in series with capacitor 17 across the secondary coil of matching transformer 31. The primary coil 38 of matching transformer 31 is driven at terminals B–B' by an AC power supply (not shown in FIG. 8**).

This matching circuit, comprising matching transformer 31 and capacitor 17, accomplishes three functions. First, we note again that plasma transformer 30 has a turns ratio of 1:1 in this embodiment, therefore the impedance appearing across A–A' will be close to the small plasma impedance 37. The matching transformer 31 has a turns ration of N:1 where N>1. Therefore, the impedance appearing across the primary of 31 will be about $N^2$ times the load on the secondary. Thus the impedance of the load seen by the power supply across B–B' is much larger the natural impedance of the plasma itself. This allows the remainder of the power supply to be designed to be simple and efficient. Second, we note that the impedance at A–A' is mostly inductive and resistive. Capacitor 17 placed in series with this load forms a resonant circuit with the inductance 36. This load may be driven at or near resonance, either by adjusting the power supply frequency or by adjusting the capacitance to set the resonant frequency to match a fixed frequency power supply. In either case, the inductive and capacitive components of the load will cancel each other on resonance, causing the load to appear purely resistive to the power supply. In this respect, capacitor 17 is useful, but not strictly necessary. It may be eliminated and replaced simply by a short, as shown in FIG. **8*b***.

Finally, one appealing feature of this embodiment is that the current travels entirely on the inner surfaces of the plasma chamber wall 11 and transformer housing 16 and 16'. The chamber can be safely touched or grounded during operation and does not produce radio interference or radiate electromagnetic energy. Nevertheless, the matching transformer provides DC isolation between the power supply and the chamber wall 11 and housing 16, giving an added measure of electrical safety.

Figure 4:
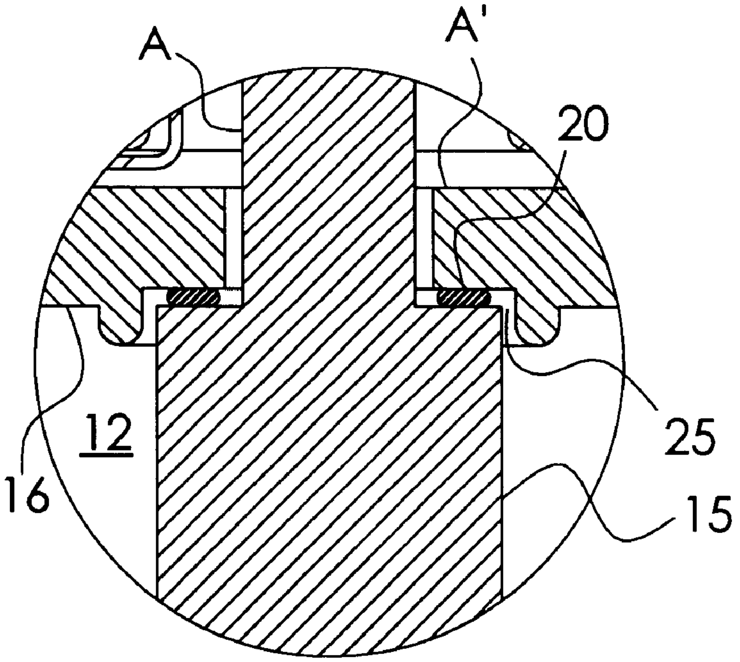
FIG. 4 Detail sectional view of insulating seal.

FIG. 4 shows a sectional view detail of the electrical break of the preferred embodiment shown in FIG. 3. An elastomeric insulating seal 20, such as an o-ring, seals the gap between the center conductor 15 and the matching transformer housing 16. The seal is protected from the deposition or erosion by the plasma using a plasma shield 25. The design of the shield may take many forms; nevertheless it is simple, and well known to those skilled in the art. First, the gap between 15 and 16 should be approximately less than a few plasma Debye lengths, in order that the plasma will not exist deep inside the gap. For most industrial plasmas a typical gap dimension should be less than 1 mm. Secondly, the seal 20 should be located several gap lengths away from the main volume of the plasma. Preferably there are one (as shown) or more bends in the channel leading from the plasma in chamber 12, to the seal 20. The bends will prevent direct line-of-sight interaction between the plasma and the seal and will further protect the seal from the flow of reactive gasses.

A suitable seal material is a fluoropolymer such as PTFE or perfluoroelastomer, which are highly resistant to high temperatures and attack by reactive gasses. A number of different manufacturers produce standard o-ring seals of this type for use in reactive gas plasmas. Since the seal as shown is compressible, it should generally be backed up by a rigid insulating shim (not shown) in order to maintain a small but fixed gap and thereby prevent accidental electrical shorting between the metal parts 15 and 16.

High power plasmas can deposit a significant amount of heat into the plasma chamber walls. Cooling the chamber and the inductive coils is a constant challenge for chambers traditionally constructed of dielectric material like quartz. In this invention however, the metal chamber facilitates simple and efficient cooling. The high thermal conductivity of a suitable metal like aluminum means that heat will be rapidly conducted through the chamber to the coolant.

Although the figures have omitted cooling means for purposes of clarity, it is straightforward for those skilled in the art to provide a cooling manifold to the outside of the chamber. The manifold may comprise tubes welded, glued, staked, or brazed to the outside surfaces of the chamber. Alternately, the cooling manifold may be composed of a series of capped channels or holes drilled in the body of the chamber. The manifold would carry chilled water or other coolant fluid and would preferably include the center conductor 15. At lower operating power it is also feasible to use only forced-air (fan) cooling.

One of the principle objects of this invention is to provide a reactive gas generator for etching materials or cleaning chip processing chambers. In those cases, it is necessary to protect the chamber walls from attack by the reactive species. For example, the invention may be used to generate atomic fluorine by breaking down a fluorine-based gas such as $NF_3$, a cleaning gas widely used in chip making. In order to protect a preferably aluminum chamber from attack by the atomic fluorine, the walls are coated with a thin layer of aluminum oxide ceramic by means of hard coat anodization. The porous ceramic coating is then further protected by impregnating it with PTFE, which is highly resistant to attack by virtually all reactive species.

Figure 5:
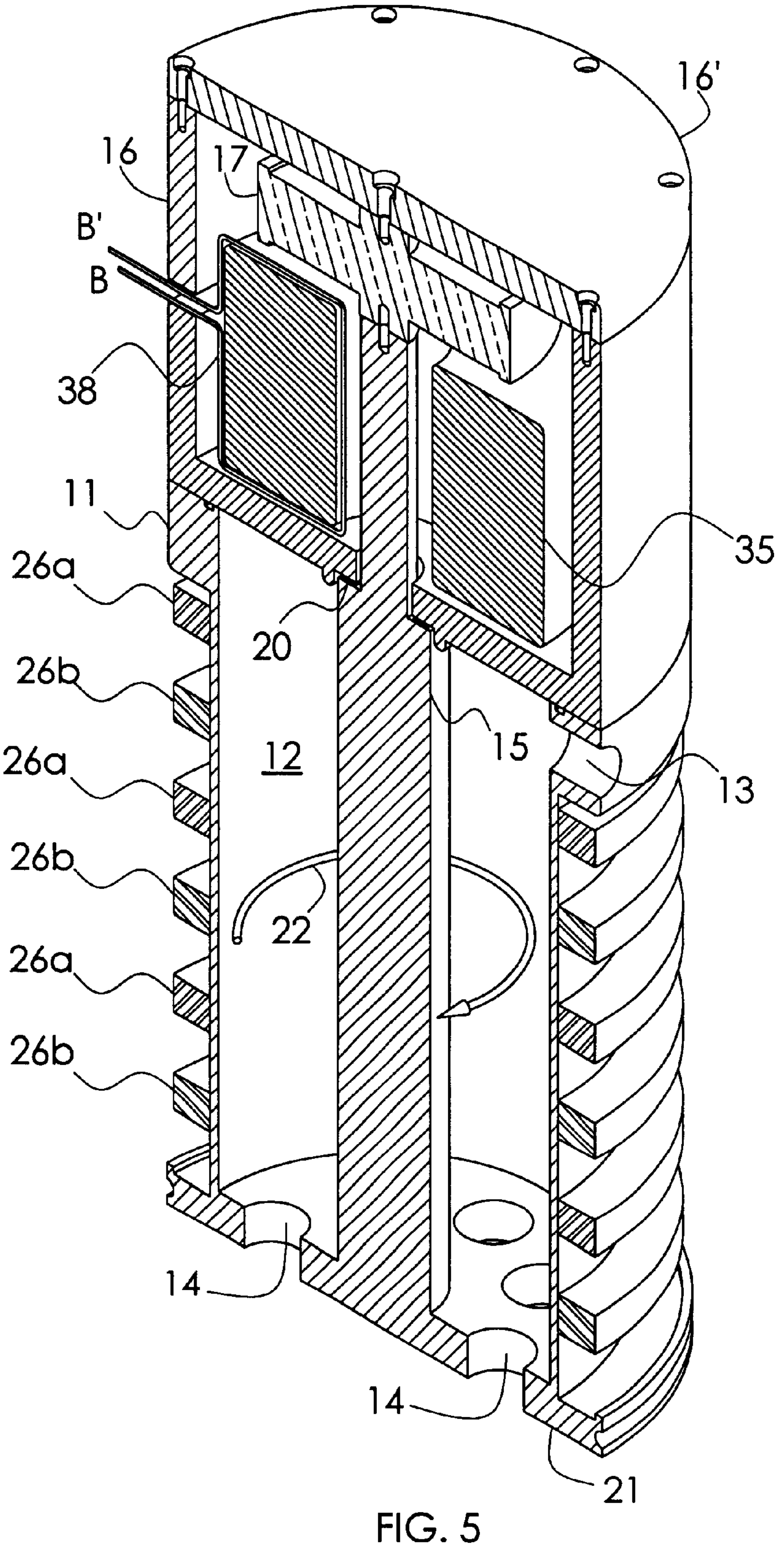
FIG. 5 Isometric sectional view of a first alternate embodiment showing multi-cusp magnet plasma confinement.

A first alternate embodiment of the invention is illustrated in FIG. 5. This embodiment provides magnetic confinement of the plasma using a set of permanent magnets 26 arranged along the walls of the plasma chamber. The magnets are arranged with alternating magnetic polarizations. In the figure, magnets 26 are circular rings polarized in the radial direction, so that field of each magnet is directed perpendicularly though the chamber wall. The magnets **26*a* are polarized in one sense (for example with the magnetic field directed radially inward) while the remaining magnets 26*b*** are polarized in the opposite sense (for example with the magnetic field directed radially outward). This arrangement produces a multi-cusp-type magnetic field on the inside of the plasma chamber. The multi-cusp magnetic field reduces the loss of plasma electrons to the chamber walls and will dramatically increase the density and uniformity of the plasma. The improvement is especially pronounced when operating at low pressures, where collisional processes that enhance the diffusion of electrons to the walls are weak. Additionally, it is sometimes difficult to start inductively coupled plasmas. Magnetic confinement increases the residence time, inside the plasma chamber, of the first few high-energy electrons that must be present when the plasma is first started. The increased residence time means those electrons can ionize more gas molecules, thereby making the plasma easier to start.

For simplicity, FIG. 5 shows multi-cusp field magnets arranged only on the outer cylindrical wall of the chamber. Nevertheless, all surfaces of the plasma chamber 12 represent a source of electron loss. It is straightforward optionally to add multi-cusp field magnets to the remaining surfaces including the chamber end caps and/or the center conductor 15, to further improve the performance of this invention. Alternately, the magnets may be arranged in straight rows extending parallel to the cylindrical axis. This permits the use of less costly straight magnets, while sacrificing some of the confinement effect. In either case, the magnets must be arranged in a north-south alternating pattern, and should be polarized so that their fields are directed perpendicularly into the plasma surface.

Figure 6:
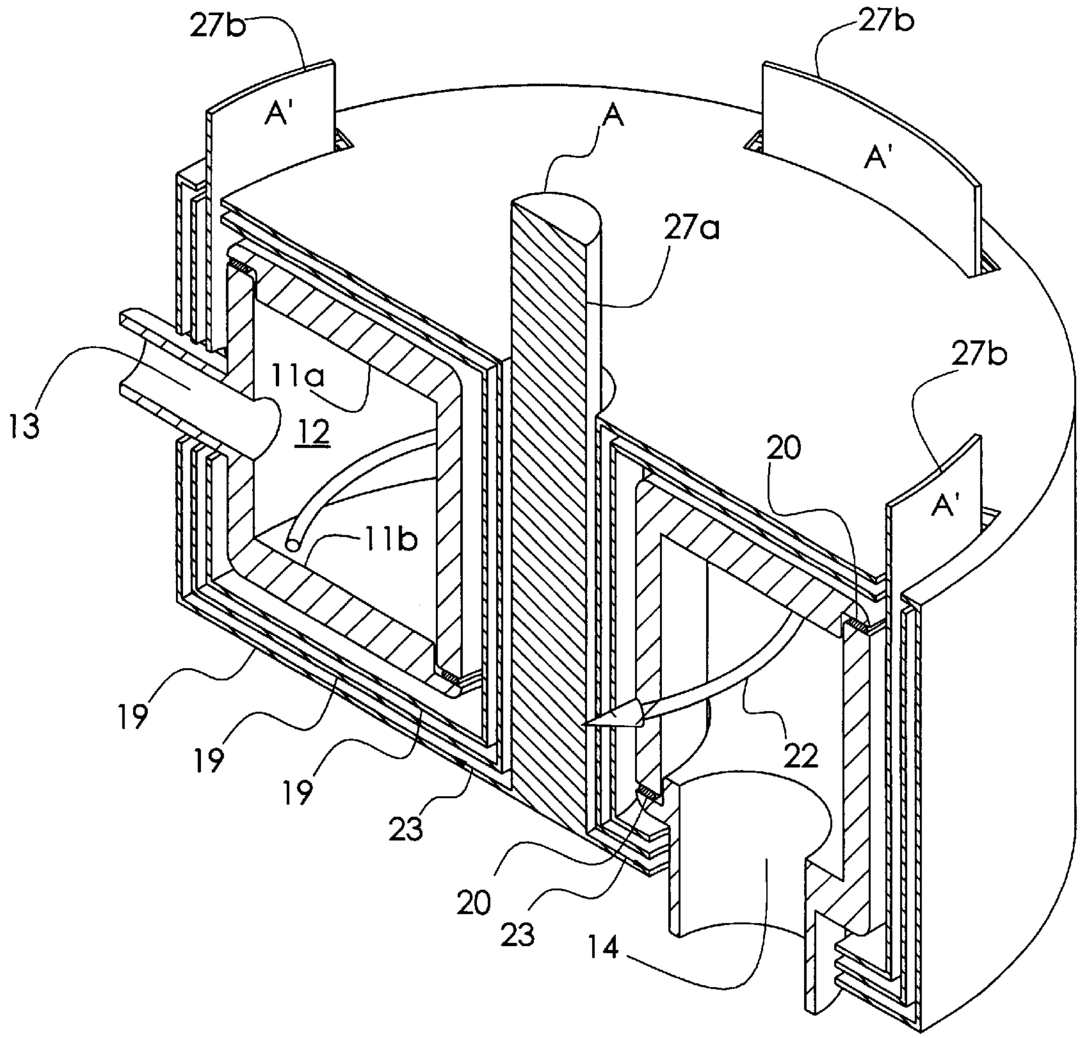
FIG. 6 Isometric sectional view of a second alternate embodiment illustrating scroll-type multi-turn toroidal primary coil.

FIG. 6 shows a centerline section of a second alternate embodiment of the invention. The embodiments illustrated in FIGS. 2,3,4 and 5 all have a plasma transformer 30 with a one-turn primary winding. In addition, that primary winding also serves a separate function as the plasma chamber wall 11. That is, the applied current 23 flows through the chamber wall 11. The embodiment of FIG. 6 illustrates a version of the invention in which the functions of plasma primary winding 19 and plasma chamber wall 11 are separated: the applied current does not flow through the chamber wall 11. Furthermore, the plasma transformer primary winding 19 has multiple turns, thereby causing the plasma transformer 30 to have a turns ratio of N:1 (N>1), rather than 1:1, as in the first two embodiments. This eliminates the need for matching transformer 31. Therefore, this embodiment may be driven resonantly as in FIG. **8*c* or non-resonantly as in FIG. 8*d***.

The figure shows the plasma chamber 12 enclosed and bounded by conductive plasma chamber wall 11. The chamber wall is composed of two halves **11*a* and 11*b*. Formed in the lower chamber half 11*b* are the gas inlet 13 and outlet 14. The halves 11*a* and 11*b* are electrically insulated from each other by electrical breaks that are sealed with insulating seals 20, as in the preceding embodiments. Although not strictly necessary, two electrical breaks are shown in this embodiment to illustrate that additional breaks can be used to further reduce any small remaining eddy-currents. Surrounding the chamber, but electrically insulated from it, is a 3-turn toroidal coil 19 that functions as the plasma transformer primary winding. The coil has terminals labeled A and A', as in the previous embodiments. By carefully tracing the path of the applied current flow 23 from terminal A to A', it can be seen that coil 19 is a single, connected, toroidal scroll. This novel coil design advantageously provides a low inductance and low resistance. The coil will necessarily have some finite impedance that will increase with the number of turns. As the number of turns on the coil is increased, the induced plasma current will increase, leading to higher plasma densities. The voltage appearing across the coil will also increase; yet, the plasma will not see this voltage. The plasma can operate at very low sheath potential because the metal chamber wall 11, shields the plasma from the high voltages present on the primary coil 19. There will be no currents induced in chamber wall 11** because of the electrical breaks, which make it impossible for current to flow in a continuous poloidal path through the wall. This result is efficient, dense, plasma generation with desirably low sheath voltages that do not promote chamber erosion and sputtering.

In general, the number of turns on coil 19 may be as few as a single turn and must be selected to match the particular plasma impedance and power supply characteristics for optimal power transfer efficiency. Three turns is typical and is generally a good starting point.

Figure 7:
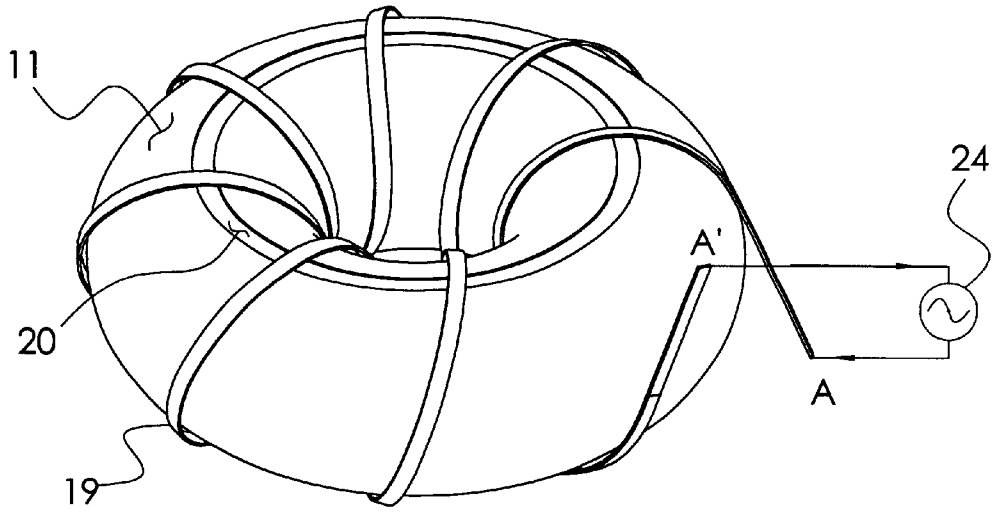
FIG. 7 Isometric view of a third alternate embodiment illustrating helical-type multi-turn toroidal primary coil, shown conceptually.

FIG. 7 is an isometric view of a third alternative embodiment. This view shows an embodiment similar to that of FIG. 6, but with an alternative coil design. The embodiment, illustrated conceptually for clarity, employs a single wire or ribbon-like plasma transformer primary coil 19 wrapped in a toroidal spiral around the plasma chamber.

As before, the plasma chamber is bounded by a conductive plasma chamber wall 11 having one or more poloidal electrical breaks that are sealed by an insulating seal 20. The wall 11 and the coil 19 are electrically insulated from each other as in FIG. 6.

In this embodiment, the applied current follows the path of the coil and is thus substantially, but not entirely in the poloidal direction. There is a small component of the applied current flow in the toroidal direction. The toroidal component of the current flow will induce some eddy currents in the chamber 11 in the toroidal direction. This situation can be easily remedied by applying a second primary coil, connected electrically in parallel to the first. The second coil is wound so that current flows same poloidal sense, but in the opposite toroidal sense as the first coil 19. The toroidal components of the current flow in each coil will cancel, leaving zero net toroidal current flow.

Compared to the embodiment of FIG. 6, the embodiment of FIG. 7 is simpler to manufacture, has lower stray capacitance due to the reduce coil surface area, and can easily be made to accommodate a large number of turns.

It is possible to supply AC power to the plasma reactor using separate, integrated RF power supply. Power would be coupled to the reactor through a coaxial cable and preferably a conventional matching network. The art is widely known (see, for example, Principles of Plasma Discharges and Materials Processing by Lieberman and Lichtenberg, Wiley, 1994) and so will not be reiterated here. Referring to FIG. 8, power may applied across terminals A–A', A–A" or B–B' as has already been discussed above.

Figure 9:
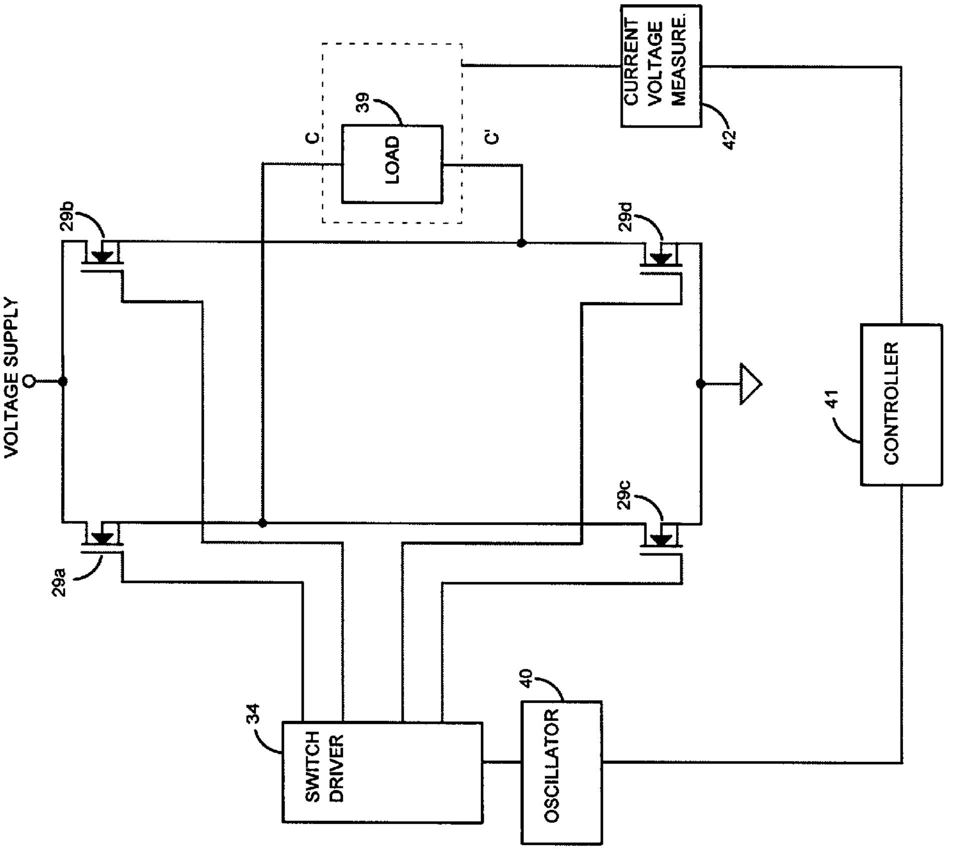
FIG. 9 Schematic of the preferred embodiment of the power supply.

It is advantageous in terms of cost, size and simplicity to integrate a power supply directly onto the reactor. A simplified version of such a power supply is shown schematically in FIG. 9. The supply uses a full-bridge switching power supply topology. It comprises four high power semiconductor switches 29 such as FET or IGBT devices. The devices are switched on or off by a switch driver 34. Numerous manufactures currently produce integrated switch driver circuits. Alternately, driver 34 may be made from discrete components in a manner that is widely known among those skilled in the art. In a first phase of operation, switches 29*a* and 29*d* are closed (conducting) while the others are open (non-conducting). Current will flow from the DC supply labeled V_DC, through the load from C to C', to ground. In the second phase of operation, switches 29*a* and 29*d* are opened. Then switches 29*b* and 29*c* are closed, causing current to flow from V_DC through the load from C' to C, to ground. In this manner, current is made to flow alternately back and forth through the load 39; the load in this case being the plasma reactor as shown in FIGS. 8*a*–8*d*.

The main DC voltage V_DC may advantageously be supplied simply and cost effectively by direct rectification and filtering of the AC line voltage. It should be noted that the switches 29 are shown as individual devices in figure, but may in practice represent a set of several discrete semiconductor devices arranged in parallel in order to handle high currents.

A variable frequency oscillator 40 drives the switch driver 34. A digital controller 41 communicates status and accepts commands from an operator or external machine control system. It controls the overall operation of the plasma reactor accordingly. Controller 41 measures parameters of the plasma load 39 such as the current and voltage in the load, via a current and voltage measurement circuit 42. The current may be measured by shunt resistor or, more preferably, by current transformer. Based on these measurements, the controller 41 adjusts the oscillator frequency to achieve resonance or maximal power transfer efficiency in the load. The details are known to those skilled in the art.

In the preceding detailed description, the invention is described with reference to specific embodiments thereof. It will however, be evident that various modifications and changes may be made thereto without departing from the broader spirit and scope of the invention as set forth in the claims. The specification and drawings are, accordingly, to be regarded in an illustrative rather than a restrictive sense.

Having described the invention, what is claimed is:

1. A plasma chemical reactor apparatus for inductively generating a plasma from process gasses comprising:

a. a chamber adapted for receiving said process gasses and for containing said plasma, b. a chamber wall having an inner surface defining said chamber, the shape of said inner surface of said chamber wall having a generally toroidal topology, said toroidal topology defining a torus with a hole, a cyclic toroidal direction encircling said hole, and a cyclic poloidal direction generally orthogonal to said toroidal direction, c. an applied AC electrical current flowing in a substantially poloidal direction around said plasma, d. a plasma excitation means comprising an electrically conductive material carrying said applied AC electrical current, e. an AC power source operatively coupled to said plasma excitation means, whereby said AC power source urges said applied AC electrical current to flow through said plasma excitation means, said applied AC electrical current, flowing generally parallel to said poloidal direction, generates an AC magnetic flux directed generally parallel to said toroidal direction within said plasma, said AC magnetic flux further induces AC electrical current to flow through said plasma in a generally poloidal direction, thereby ionizing said process gasses and inductively heating and maintaining said plasma, without having any portion of said plasma surrounded by a magnetic core.

2. The apparatus of claim 1 wherein said chamber wall comprises:

a. at least one metallic portion, b. at least one electrically insulative portion, encircling the chamber completely in said toroidal direction, providing an electrical break in said poloidal direction, thereby preventing induced electrical currents from circulating continuously through said chamber wall in said poloidal direction, whereby the AC electrical power from said AC power source is efficiently coupled into said plasma.

3. The apparatus of claim 2 wherein said plasma excitation means comprises said at least one metallic portion of said chamber wall, said applied AC electrical current flowing generally along said poloidal direction through portions of said chamber wall, whereby said chamber wall serves additionally to carry said applied AC electrical current.

4. The apparatus of claim 2 wherein said plasma excitation means surrounds said chamber wall and is generally insulated therefrom, said plasma excitation means being electrically coupled to said chamber wall at no more than one point, whereby said applied AC electrical current does not flow through said chamber wall.

5. The apparatus of claim 1 wherein said plasma excitation means comprises a coil, said coil comprising a plurality of turns wound around said chamber and passing through said hole in said torus.

6. The apparatus of claim 1 wherein said chamber wall substantially consists of a dielectric material.

7. The apparatus of claim 1 wherein the toroidal inner surface of said chamber is further generally a surface of rotation, said surface of rotation being defined by sweeping a closed two-dimensional curve about an axis co-planar and non-intersecting with said closed two-dimensional curve.

8. The apparatus of claim 1 further comprising a plurality of permanent magnets disposed across said chamber wall and generally surrounding said chamber volume, wherein each said permanent magnet is magnetically polarized in a direction substantially anti-parallel to the polarization of adjacent permanent magnets, said permanent magnets producing a multi-cusp magnetic field surrounding and confining said plasma, whereby said plasma is more easily started and the plasma density of said plasma is higher.

9. The apparatus of claim 1 wherein said apparatus further comprises at least one inlet opening disposed in said chamber wall and at least one outlet opening disposed in said chamber wall whereby process gasses may be controllably flowed through said chamber.

10. The apparatus of claim 2 wherein said inner surface of said chamber wall is coated with a coating material resistant to erosion by said plasma.

11. The apparatus of claim 10 wherein said coating material comprises a ceramic.

12. The apparatus of claim 10 wherein said at least one metallic portion of said chamber wall is aluminum and said coating is formed by anodization.

13. The apparatus of claim 10 wherein said coating material comprises a fluoropolymer.

14. The apparatus of claim 9 wherein said chamber is further coupled to a workpiece processing chamber, said at least one outlet opening providing fluid communication of reactive chemical species generated by said plasma into said workpiece processing chamber, whereby the inner walls of said workpiece processing chamber are cleaned by said reactive chemical species.

15. The apparatus of claim 9 wherein said chamber is further coupled to a workpiece processing chamber containing a workpiece, said at least one outlet opening providing fluid communication of reactive chemical species generated by said plasma into said workpiece processing chamber whereby said workpiece undergoes a processing step selected from the group of etching, deposition, ashing, and atomic layer deposition.

16. The apparatus of claim 9 wherein said chamber is further provided with a workpiece opening adapted to receive a workpiece into said chamber, whereby said workpiece is undergoes a processing step selected from the group of etching, deposition, ashing, and atomic layer deposition.

17. The apparatus of claim 9 further comprising an extraction electrode positioned near said at least one outlet opening, said extraction electrode having an electrical potential different from said chamber wall, whereby ions are pulled out of said at least one outlet opening and accelerated, thereby forming an ion beam.

18. The apparatus of claim 9 wherein said at least one inlet opening accepts process gasses comprising waste gasses into said chamber, said plasma promoting chemical reactions amongst said process gasses, thereby transforming said waste gasses into more benign chemical species that are exhausted through said at least one outlet opening, whereby said waste gasses are treated.

19. The apparatus of claim 1 wherein said process gasses comprise elements selected from the group consisting of hydrogen, oxygen, chlorine, fluorine, nitrogen, helium, neon, argon, krypton, and xenon.

20. The apparatus of claim 2 wherein the electrically insulative portions are mounted in narrow convoluted recesses between the metallic portions, whereby the electrically insulative portions are protected from said plasma.

21. The apparatus of claim 1 wherein said AC power source comprises:

a. an AC power supply, b. an impedance matching circuit, operatively interposed between said AC power supply and said plasma excitation means, whereby power is efficiently transmitted from said an AC power supply into said plasma.

22. The apparatus of claim 1 wherein said AC power source comprises a solid-state AC switching power supply, said solid state AC switching power supply comprising one or more switching semiconductor devices coupled to a voltage supply and having an output coupled directly to said plasma excitation means.

23. The apparatus of claim 1 wherein said AC power source comprises:

a. a solid-state AC switching power supply, said solid state AC switching power supply comprising one or more switching semiconductor devices coupled to a voltage supply and having an output, b. a capacitance disposed between said output of said switching semiconductor devices of said AC switching power supply and said plasma excitation means, and electrically coupled thereto, said capacitance and the impedance appearing across said plasma excitation means together forming a resonant circuit having a resonant frequency, wherein said AC switching power supply switches at a frequency substantially equal to said resonant frequency, whereby power is efficiently transmitted from said an AC power supply into said plasma.

24. The apparatus of claim 1 wherein said AC power source comprises:

a. a solid-state AC switching power supply, said solid state AC switching power supply comprising one or more switching semiconductor devices coupled to a voltage supply and having an output, b. an impedance matching transformer having a primary winding coupled to said output of said switching semiconductor devices of said AC switching power supply and a secondary winding coupled to said plasma excitation means, whereby power is efficiently transmitted from said an AC switching power supply into said plasma.

25. The apparatus of claim 1 wherein said AC power source comprises:

a. a solid-state AC switching power supply, said solid state AC switching power supply comprising one or more switching semiconductor devices coupled to a voltage supply and having an output, b. an impedance matching transformer having a primary winding coupled to said output of said switching semiconductor devices of said AC switching power supply and having a secondary winding, c. a capacitance disposed between said secondary winding of said impedance matching transformer and said plasma excitation means, and electrically coupled therebetween, said capacitance and the impedance appearing across said plasma excitation means together forming a resonant circuit having a resonant frequency, wherein said AC switching power supply switches at a frequency substantially equal to said resonant frequency, whereby power is efficiently transmitted from said an AC power supply into said plasma.

26. The apparatus of claim 5 wherein the number of turns is chosen so the electrical impedance appearing across the terminals of said plasma excitation means is approximately matched to the electrical impedance of said AC power source, whereby the AC electrical power from said AC power source is efficiently coupled into said plasma.

* * * * *